US009268771B2

(12) United States Patent  
Bozionek et al.

(10) Patent No.: US 9,268,771 B2  
(45) Date of Patent: Feb. 23, 2016

(54) METHOD AND ARRANGEMENT FOR MANAGING DOCUMENTS IN ELECTRONIC DOCUMENT FOLDERS

(75) Inventors: Bruno Bozionek, Borchen (DE); Thomas Hanna, Detmold (DE); Klaus-Josef Kunte, Borchen (DE); Rainer Zimmermann, Paderborn (DE)

(73) Assignee: Unify GmbH & Co. LG, Munich (DE)

( * ) Notice: Subject to any disclaimer, the term of this patent is extended or adjusted under 35 U.S.C. 154(b) by 929 days.

(21) Appl. No.: 11/664,145

(22) PCT Filed: Sep. 5, 2005

(86) PCT No.: PCT/EP2005/054349
§ 371 (c)(1),
(2), (4) Date: Mar. 29, 2007

(87) PCT Pub. No.: WO2006/034942
PCT Pub. Date: Apr. 6, 2006

(65) Prior Publication Data
US 2008/0133621 A1    Jun. 5, 2008

(30) Foreign Application Priority Data
Sep. 30, 2004    (DE) .......................... 10 2004 047 750

(51) Int. Cl.
*G06F 17/30*    (2006.01)
*G06Q 10/10*    (2012.01)

(52) U.S. Cl.
CPC .............. *G06F 17/30* (2013.01); *G06Q 10/107* (2013.01)

(58) Field of Classification Search
USPC ........................................................ 707/204
See application file for complete search history.

(56) References Cited

U.S. PATENT DOCUMENTS

| | | | |
|---|---|---|---|
| 5,689,699 A | 11/1997 | Howell et al. | |
| 6,367,013 B1 * | 4/2002 | Bisbee et al. | 713/178 |
| 6,601,088 B1 * | 7/2003 | Kelley et al. | 709/206 |
| 2002/0019827 A1 * | 2/2002 | Shiman et al. | 707/200 |
| 2002/0026487 A1 | 2/2002 | Ogilvie et al. | |

(Continued)

FOREIGN PATENT DOCUMENTS

| | | |
|---|---|---|
| WO | WO 01/75651 A2 | 10/2001 |
| WO | WO 02/19161 A2 | 3/2002 |

OTHER PUBLICATIONS

R. Gellens, C. Newman, L. Lundblade, "POP3 Extension Mechanism" IETF Standard Working Draft, Internet Engineering Task Force, IETF, CH, No. 8, Sep. 4, 1999, pp. 1-18, XP015013545, ISSN: 0000-0004.

*Primary Examiner* — Mahesh Dwivedi

(74) *Attorney, Agent, or Firm* — Buchanan Ingersoll & Rooney PC

(57) ABSTRACT

In one aspect, a method for managing documents or partial documents in an electronic document folder is provided. A validity indication, which is individual to the document or partial document and specifies a validity expiry time is assigned to a respective document, e.g. an e-mail, or a partial document, e.g. an e-mail attachment and is stored, the indication being assigned to an executable validity program. Once the validity expiry time has been reached, the executable validity program, assigned to the validity indication, is executed for the document or partial document with an assigned validity indication. The executable validity program comprises a deletion routine for deleting the document or partial document with the assigned validity indication in the electronic document folder.

21 Claims, 1 Drawing Sheet

(56) References Cited

U.S. PATENT DOCUMENTS

| | | |
|---|---|---|
| 2004/0064434 A1* | 4/2004 | Sampson .......................... 707/1 |
| 2004/0172453 A1* | 9/2004 | De Mendonca et al. ...... 709/206 |
| 2004/0186851 A1 | 9/2004 | Jhingan et al. |
| 2005/0076244 A1* | 4/2005 | Watanabe ..................... 713/201 |
| 2005/0132010 A1* | 6/2005 | Muller .......................... 709/206 |
| 2005/0198086 A1* | 9/2005 | Moore et al. .................. 707/204 |
| 2005/0235204 A1* | 10/2005 | Matsumoto ................... 715/539 |
| 2007/0271464 A1* | 11/2007 | Rico Novella ................ 713/181 |

\* cited by examiner

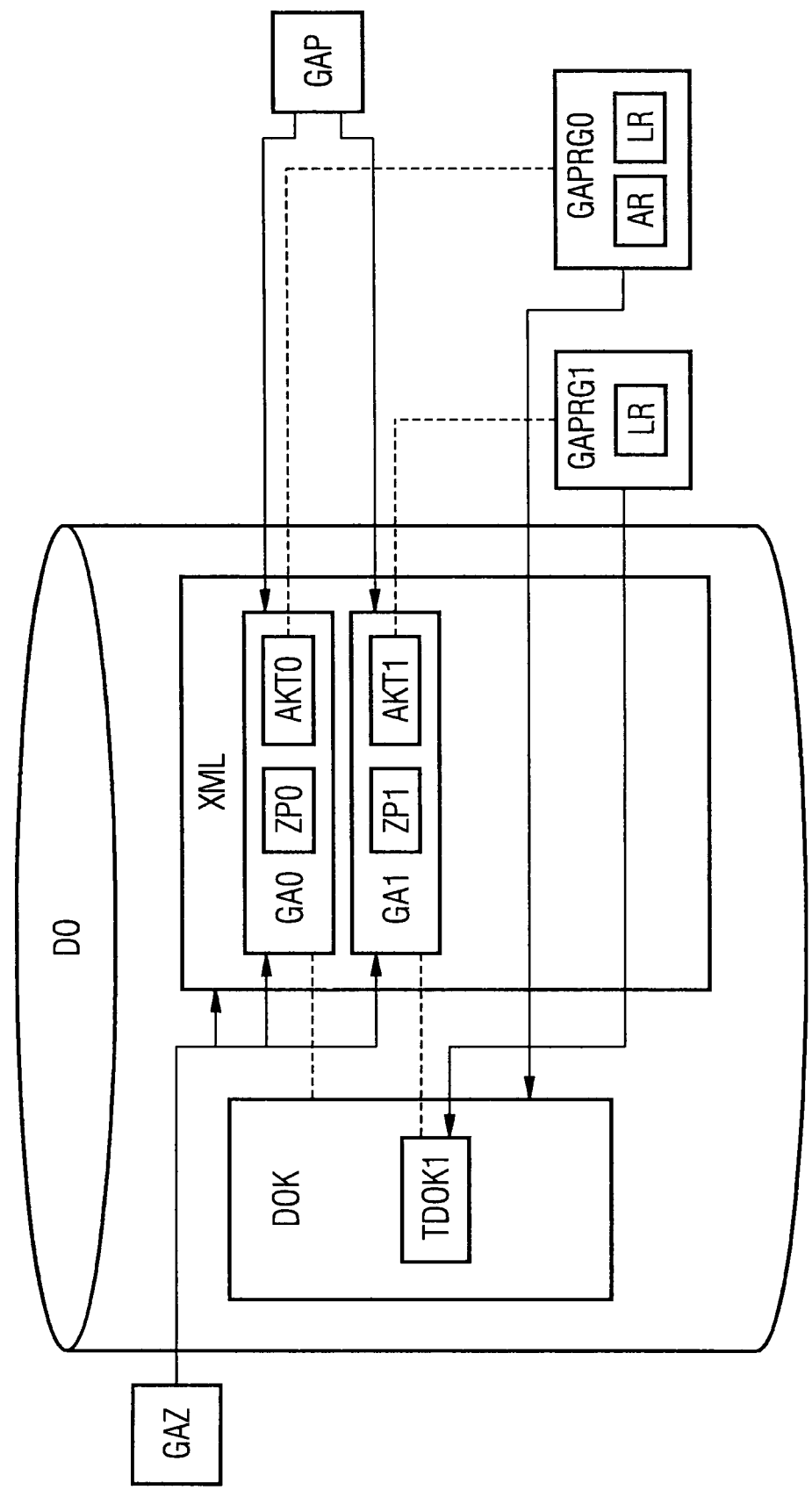

METHOD AND ARRANGEMENT FOR MANAGING DOCUMENTS IN ELECTRONIC DOCUMENT FOLDERS

CROSS REFERENCE TO RELATED APPLICATIONS

This application is the US National Stage of International Application No. PCT/EP2005/054349, filed Sep. 5, 2005 and claims the benefit thereof. The International Application claims the benefits of German application No. 102004047750.7 DE filed Sep. 30, 2004, both of the applications are incorporated by reference herein in their entirety.

FIELD OF INVENTION

The present invention relates to a method and arrangement for managing documents in electronic document folders.

BACKGROUND OF INVENTION

Documents are organized in modern electronic document management systems mostly by means of electronic document folders. Thus, for example, e-mails arriving in e-mail systems are filed by users of said systems in document folders on a central e-mail server. There they remain until the respective e-mail system user either deletes an e-mail manually or manually moves it to a local document folder. Because especially e-mails having attachments or embedded objects, frequently also called OLE (OLE: Object Linking and Embedding) objects, require a large amount of memory, the filing of such e-mails requires large memory capacities in the document folders of the central e-mail server.

SUMMARY OF INVENTION

In order to reduce the amount of memory space occupied on the e-mail server, conventional e-mail systems frequently allow e-mails to be moved under program control to a separate archiving folder, which is to say to be archived.

An object of the present invention is to disclose a method and an arrangement for managing documents in electronic document folders that will in combination allow the memory occupancy of the electronic document folders, particularly on a central e-mail server, to be reduced.

Said object is achieved via a method and an arrangement described in the claims.

According to the invention, for managing documents—for example electronic messages such as e-mails, or partial documents, for instance parts of documents, e-mail attachments, sections of text in an e-mail, or objects embedded in an e-mail—in an electronic document folder, for example an e-mail folder on an e-mail server, a validity indication that indicates a validity expiration time and is specific to an individual document or partial document is stored allocated to a respective document or partial document. Said validity indication has been allocated a validity expiration program that will be executed for the document or partial document allocated to the validity indication once the validity expiration time has been reached. The validity expiration program therein includes a deletion routine for deleting the document or partial document allocated to the validity indication from the electronic document folder.

The invention allows the memory occupancy in the electronic document folder to be reduced because at least parts of a document will be deleted once the validity expiration time has been reached. It is advantageous that individual deleting of a partial document, preferably one requiring a large amount of memory, is facilitated alongside deleting of the entire document including, where applicable, all partial documents contained therein.

Advantageous embodiments of the invention are described in the dependent claims.

According to a development of the invention the validity expiration program is able, before the deletion routine is called for deleting the document or partial document, to call an archiving routine for archiving or a querying routine for changing the document's or partial document's validity indication, with the querying routine conveying a query to an owner of the document or partial document and, depending on a response from the owner, executing the deletion routine or storing a changed validity indication. A changed validity indication can in particular be an indication preventing the validity expiration program or deletion routine from being called. That will allow the document or partial document to be stored for an unlimited period of time in the document folder.

A consequent advantage for the document owner is that, for example, a set validity indication will not be unconditionally canceled once the validity expiration time has been reached; the document or partial document can instead also be individually archived for accessing later. It is additionally advantageous for the owner to be able by storing a changed validity indication to individually extend a document's or partial document's validity and for the document or partial document consequently to remain stored in the document folder until the changed validity indication has been reached.

According to an advantageous embodiment of the invention the method can encompass a validity expiration program that is specific to an individual document or partial document, meaning that different validity expiration programs can be executed for different documents or partial documents once a validity expiration time has been reached. For example, in an e-mail system a deletion routine can be assigned to an e-mail's attachments, while the e-mail address is allocated an archiving routine for saving the e-mail address to a local e-mail folder before a deletion routine is called for deleting the e-mail on the central server.

According to an advantageous embodiment of the invention, filing of the document in the electronic document filing system can cause the validity indication to be stored in a manner specific to the individual document or partial document. Thus, for example, in an e-mail system the validity indications requiring to be allocated can, following receipt of an e-mail, be generated through the e-mail's being stored in the e-mail server folder for the first time. What is advantageous therein is that all documents and partial documents in the electronic document filing system can thereby each be allocated a validity indication so that a program module that reads the respective validity indication of a document or partial document can assume the presence of the validity indication and access the data using simplified accessing routines with no pre-checking.

According to a further advantageous embodiment of the invention a validity indication can be allocated to a document or partial document and/or the validity expiration program can be allocated to a validity indication as a function of the document's or partial document's type, the memory space it requires, and/or a part of its file name. As file types it is possible to distinguish between, for instance, text files and binary files. The part of the file name can in particular be a file extension, for example "gif" for a graphics file, "ppt" for a presentation file, and "doc" for a text file having a respectively specific file format. In the case, for example, of e-mail documents having as partial documents graphics and text attachments, a deletion routine can be assigned to a graphics attachment and a deletion routine to a text attachment, with additional calling of a querying routine for changing the validity indication.

According to a further advantageous embodiment of the invention the validity indication and/or validity expiration information identifying the validity expiration program can be stored in an XML (XML: Extensible Markup Language) dataset allocated to the document or partial document. It is therein advantageous that owing to the structured storage of any data in an XML dataset it can be accessed simply and by standard means. It is thus possible, for example, to produce a common XML dataset for a document, including its partial documents, and within said XML dataset in each case define a separate XML data structure for the document and a respective partial document for storing the validity indication and validity information.

BRIEF DESCRIPTION OF THE DRAWINGS

An exemplary embodiment of the invention is explained in more detail below with reference to the drawing.

FIG. 1 is a schematic of a document folder and of program modules that access it.

DETAILED DESCRIPTION OF INVENTION

FIG. 1 is a schematic of an e-mail server folder DO as a document folder, an e-mail DOK stored in the e-mail server folder DO as a document, and a validity indication allocation module GAZ, validity checking module GAP, validity expiration program GAPRG0, and validity expiration program GAPRG1 as program modules that access the contents of the document folder DO. The e-mail DOK therein contains an e-mail attachment TDOK1 as a partial document. Further shown in FIG. 1 is an XML dataset XML containing validity indications GA0 and GA1. The validity indication GA0 specifies a validity expiration time ZP0, preferably a date, as well as providing validity expiration information AKT0, and the validity indication GA1 specifies a validity expiration time ZP1 as well as providing validity expiration information AKT1. The validity expiration information AKT0 and AKT1 in each case determine which validity expiration program GAPRG0 or GAPRG1 allocated to the respective validity indication GA0 or GA1 is to be executed. The validity expiration information AKT0 has therein been allocated the validity expiration program GAPRG0 and the validity expiration information AKT1 has been allocated the validity expiration program GAPRG1. The allocations between the document DOK, or partial document TDOK1 and the respective validity indication GA0 or GA1 as well as the allocation between the validity expiration information AKT0 or AKT1 and the validity expiration program GAPRG0 or GAPRG1 are shown in the drawing by means of dashed lines. Accessing by the program module GAZ, GAP, GAPRG0, or GAPRG1 of the document DOK or partial document TDOK1, and of the XML dataset XML, or the validity indications GA0 or GA1 is shown in each case by means of an arrow leading from the respective program module. The validity expiration program GAPRG1 contains a deletion routine LR for deleting the e-mail allocated to a respective validity indication or the e-mail attachment allocated to a respective validity indication in the e-mail server folder DO. The validity expiration program GAPRG0 contains a deletion routine LR and, additionally, an archiving routine AR that is called before the deletion routine LR.

Let the case be considered for the present exemplary embodiment that the e-mail DOK, along with the e-mail attachment TDOK1 it contains, arrives in an e-mail system and is stored in the e-mail server folder DO. That causes the validity indication allocation module GAZ to produce a validity indication GA0 allocated to the e-mail DOK and a validity indication GA1 allocated to the first email attachment TDOK1 and store them allocated to the respective validity indication GA0 or, as the case may be, GA1 in the XML dataset XML.

The stored validity indications GA0 and GA1 can preferably be changed manually by a respective e-mail owner.

At regular intervals by means of an XML parser, a validity checking module GAP reads the validity indications GA0 and GA1 stored in the XML dataset XML and checks whether a respective validity expiration time ZP0 and ZP1 has been reached. The validity expiration program GAPRG0 or GAPRG1 determined by the respective validity expiration information AKT0 or AKT1 will be called as soon as a respective validity expiration time ZP0 or ZP1 has been reached.

In the present exemplary embodiment the validity expiration information AKT1 has been allocated the validity expiration program GAPRG1 so that the validity checking module GAP will call the validity expiration program GAPRG1 once the validity expiration time ZP1 has been reached. Said validity expiration program GAPRG1 will call the deletion routine LR it contains and specifically delete the partial document TDOK1 allocated to the validity indication GA1 from the e-mail server folder DO, while the remainder of the e-mail DOK will continue being stored. The memory occupancy in the e-mail server folder DO will be reduced thereby.

The validity expiration information AKT0 has furthermore been allocated the validity expiration program GAPRG0 so that the validity checking module GAP will execute the validity expiration program GAPRG0 once the validity expiration time ZP0 has been reached. The validity expiration program GAPRG0 will first call the archiving routine AR it contains that will specifically move the e-mail DOK allocated to the validity indication GA0 to an archiving folder (not shown in the drawing). The deletion routine LR said program contains will finally be called for specifically deleting the e-mail DOK from the e-mail server folder DO.

The invention claimed is:

1. A method for managing at least one document in an electronic document folder stored on a server comprising:
   assigning a validity indication for a delimited section of text within the document after the document is received, the validity indication indicating a validity expiration time;
   storing the validity indication;
   checking the validity indication to determine if the validity expiration time has been reached;
   running a validity expiration program after the validity expiration time has been reached, the validity expiration program having a deletion routine configured to delete the delimited section of text to which the validity indication is assigned, the validity expiration program also utilizing a querying routine for changing the validity indication, the querying routine configured to be utilized before the deletion routine is executed, the querying routine conveying a query to a recipient of the delimited section of text, the query configured such that a response to the query is configured to change the validity indication to identify a later validity expiration time and then store that changed validity indication; and
   processing the deletion routing to delete the delimited section of to which the validity indication is assigned from the server after the validity indication time identified by the validity indication expires.

2. The method as claimed in claim 1, wherein the recipient is an owner of the document and wherein prior to calling the deletion routine, the method further comprising archiving at least the portion of the document via an archiving routine called by the validity expiration program.

3. The method as claimed in claim 1, wherein the validity expiration program is specific to the document.

4. The method as claimed in claim 1, wherein the storing of the validity indication is in response to a filing of the document in an electronic document filing system.

5. The method as claimed in claim 1, wherein the validity indication is assigned as a function of a document indicator, the document indicator selected from the group consisting of document type, memory space requirement, a part of the file name of the document, a part of the file name of an attached document and any combination thereof.

6. The method as claimed in claim 1, wherein the document is an electronic message.

7. The method as claimed in claim 1, wherein the document is a message attachment to an electronic message.

8. The method as claimed in claim 6, wherein the delimited section of text is a delimited section of text in an electronic message.

9. The method as claimed in claim 1, wherein at least a portion of the validity indication is stored in an XML dataset.

10. The method as claimed in claim 9, further comprising routing the XML dataset to an XML parser, reading the XML dataset with an XML parser, extracting the validity expiration time from the XML dataset, forwarding the extracted validity expiration time to a validity indication checking module for checking the validity indication to determine whether the validity expiration time has been reached.

11. The method as claimed in claim 1, wherein expiration of the validity expiration time is checked at regular intervals.

12. A system for managing at least a portion of a document in an electronic document folder stored on a computer or a server comprising:
 a validity indication allocation module configured to assign a validity indication specific to a delimited section of text within the document, the validity indication including a validity expiration time, the validity indication allocation module also configured to store the validity indication on the computer or the server;
 a validity indication checking module configured to identify the validity expiration time from the validity indication and determine whether the validity expiration time has been reached;
 a validity expiration program that has a deletion routine, the deletion routine configured to delete the delimited section of text within the document from the electronic document folder in response to reaching the validity expiration time; and
 a querying routine module for changing the validity indication, the querying routine module configured to convey a query to a recipient of the document before the deletion routine is executed; the querying routine module configured such that a response to the query changes the validity indication to indicate a later expiration time.

13. The system as claimed in claim 12, wherein the recipient is an owner of the document and the validity indication allocation module is configured to store the validity indication in response to a filing of the document in an electronic document filing system.

14. The system as claimed in claim 13, wherein the document is an electronic message.

15. The system as claimed in claim 12, wherein the document is a message attachment to an electronic message.

16. The system as claimed in claim 14, wherein the delimited section of text is a delimited section of text in an electronic message.

17. The system as claimed in claim 14, wherein the validity indication is allocated to the document as a function of a document indicator, the document indicator selected from the group consisting of document type, memory space requirement, a part of the file name of the document, and a part of the file name of an attached document.

18. The system as claimed in claim 17, wherein the validity expiration program is configured to archive at least a portion of the document via an archiving routine called by the validity expiration program prior to running the deletion routine.

19. The system as claimed in claim 18, wherein the validity expiration program is configured to call the querying routine module for changing the validity indication before the deletion routine is executed.

20. The system of claim 12 further comprising an XML parser and wherein the validity indication allocation module is also configured to store at least a portion of the validity indication in an XML dataset, the XML parser configured to read the XML dataset to extract the validity expiration time from the XML dataset and forward the extracted validity expiration time to the validity indication checking module for checking the validity indication to determine whether the validity expiration time has been reached.

21. The system of claim 12 wherein the validity indication allocation module is comprised of an XML parser and wherein the validity indication allocation module is also configured to store at least a portion of the validity indication in an XML dataset, the XML parser configured to read the XML dataset to extract the validity expiration time from the XML dataset for the validity indication allocation module to check the validity indication to determine whether the validity expiration time has been reached.

\* \* \* \* \*